(12) United States Patent  (10) Patent No.: US 8,992,122 B2
Sugano et al.  (45) Date of Patent: Mar. 31, 2015

(54) ELECTRO-REMEDIATION (75) Inventors: Shigeo Sugano, Kyoto (JP); Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 159 days.

(21) Appl. No.: 13/504,473

(22) PCT Filed: Oct. 12, 2011

(86) PCT No.: PCT/US2011/056012
§ 371 (c)(1),
(2), (4) Date: Apr. 26, 2012

(87) PCT Pub. No.: WO2013/055333
PCT Pub. Date: Apr. 18, 2013

(65) Prior Publication Data
US 2013/0094907 A1 Apr. 18, 2013

(51) Int. Cl.
B09C 1/00 (2006.01)
B09C 1/08 (2006.01)
C25C 7/02 (2006.01)
C25C 7/00 (2006.01)
C25C 1/00 (2006.01)

(52) U.S. Cl.
CPC ... B09C 1/00 (2013.01); C25C 1/00 (2013.01); C25C 7/00 (2013.01)
USPC .................. 405/128.15; 405/128.1

(58) Field of Classification Search
CPC ............... B09C 1/085; B09C 2101/00
See application file for complete search history.

(56) References Cited

U.S. PATENT DOCUMENTS

| 3,980,541 | A | * | 9/1976 | Aine | 204/554 |
| 4,175,026 | A | * | 11/1979 | Houseman | 204/272 |
| 4,175,036 | A | | 11/1979 | Frykhult | |
| 5,415,744 | A | | 5/1995 | Jacobs | |
| 5,433,829 | A | | 7/1995 | Pool | |
| 5,837,122 | A | * | 11/1998 | Snyder et al. | 205/560 |
| 5,865,964 | A | | 2/1999 | Clarke et al. | |
| 6,162,333 | A | * | 12/2000 | Lemon et al. | 204/260 |
| 6,951,436 | B2 | * | 10/2005 | Stegemeier et al. | 405/128.4 |
| 7,037,040 | B2 | * | 5/2006 | Phillips et al. | 405/129.6 |
| 7,618,215 | B2 | | 11/2009 | Haemers et al. | |
| 2003/0192713 | A1 | * | 10/2003 | Orsini et al. | 174/7 |

FOREIGN PATENT DOCUMENTS

| CN | 2264912 Y | 3/1996 |
| CN | 2423268 Y | 1/2000 |
| JP | 2004-66098 A | 8/2002 |

(Continued)

OTHER PUBLICATIONS

"Beaver Tracks Pvt. Ltd.", from the web site of Beaver, www.dthrotarydrilling.com, Copyright 2009, 1 page.

(Continued)

*Primary Examiner* — Keith Hendricks
*Assistant Examiner* — Salil Jain
(74) *Attorney, Agent, or Firm* — Knobbe, Martens, Olson & Bear, LLP (57) ABSTRACT Embodiments provided herein relate to electro-remediation. In some embodiments, an apparatus for collecting metal is provided and includes a helically shaped electrode. An electrical current can be applied to the apparatus causing metal and ions thereof to become fixed to the electrode.

33 Claims, 4 Drawing Sheets (56) References Cited

FOREIGN PATENT DOCUMENTS

| JP | 2006-021079 | 1/2006 |
|---|---|---|
| JP | 2007-307432 | 11/2007 |
| WO | WO 2004/028717 | 4/2004 |
| WO | WO 2005/102194 | 11/2005 |

OTHER PUBLICATIONS

"Cast iron" from Wikipedia website, http://en.wikipedia.org/wiki/Cast_iron, available in some form no later than Feb. 23, 2011. While the website as it existed on Feb. 23, 2011 is not in Applicant's possession, Applicant has provided the website that was modified on Dec. 29, 2011, 8 pages.
"CM—341 Crawler", from the web site of Beaver, www.dthrotarydrilling.com, Copyright 2009, 1 page.
"Electrochemical Remediation Technologies", from the web site http://www.cpeo.org/techtree/ttdescript/ecrta.htm, available in some form no later than Feb. 23, 2011. While the website as it existed on Feb. 23, 2011 is not in Applicant's possession, Applicant has provided the website that was printed on Mar. 31, 2011, 2 pages.
"Engineering plastic", from Wikipedia website, http://en.wikipedia.org/wiki/Engineering_plastic, available in some form no later than Feb. 23, 2011. While the website as it existed on Feb. 23, 2011 is not in Applicant's possession, Applicant has provided the website that was modified on May 12, 2011, 2 pages.
"Furukawa PCR200 crawler drill", from the web site of the Sunway Group, http://www.sunway.com.my/swent88/product2.html, Copyright 2006, 2 pages.
Goudie, J., "Silicon rubber for electrical insulators", Rubber Technology International, 1998, pp. 22-25.
http://www.geo.uni-halle.de/geofern/mitglieder/goetze/1251711_2290214/?lang=en, available in some form no later than Feb. 23, 2011. While the website as it existed on Feb. 23, 2011 is not in Applicant's possession, Applicant has provided the website that was modified Nov. 23, 2011, 2 pages.
http://www.kuramoto-giken.com/img/page1/hidari6.jpg, available in some form no later than Feb. 23, 2011. While the website as it existed on Feb. 23, 2011 is not in Applicant's possession, Applicant has provided the website that was printed on Jan. 17, 2012, 1 page.
http://www2.odn.ne.jp/~mikawakikai/page005.html, available in some form no later than Feb. 23, 2011. While the website as it existed on Feb. 23, 2011 is not in Applicant's possession, Applicant has provided the website that was printed on Jan. 17, 2012, 4 pages.
http://yth.town-web.net/paper_essay/Inaba-on-metal/MINABA-report-on-metal.htm, While these are website documents, and the original date of publication and contents of the publication are unknown, some version of the website was available prior to Aug. 26, 2011.
"Insulator (electrical)" from Wikipedia website, http://en.wikipedia.org/wiki/Insulator_(electrical), available in some form no later than Feb. 23, 2011, While the website as it existed on Feb. 23, 2011 is not in Applicant's possession, Applicant has provided the website that was modified on Dec. 8, 2011, 1 page.
"Lost-wax technology" from the web site of Castem group, http://www.castem.co.jp/lostwax/tech.html, Copyright 2008, 6 pages.
"Lost-wax casting" from Wikipedia website, http://en.wikipedia.org/wiki/Lost-wax_casting, available in some form no later than Feb. 23, 2011, While the website as it existed on Feb. 23, 2011 is not in Applicant's possession, Applicant has provided the website that was modified on Dec. 14, 2011, 13 pages.
McIntyre et al., "A Manual for Making CFRP tubes", 21 pages.

Niinae et al., "Effect of Electrode Configuration on Cleanup Efficiency of Heavy Metals by Electrokinetic Soil Remediation," (in Japanese), Resource Processing 53: pp. 49-57, 2006.
PCT International Search Report and Written Opinion mailed Dec. 7, 2011 in Application No. PCT/US2011/056012, filed Oct. 12, 2011.
"Soil liquefaction", from Wikipedia website, http://en.wikipedia.org/wiki/Soil_liquefaction available in some form no later than Feb. 23, 2011, While the website as it existed on Feb. 23, 2011 is not in Applicant's possession, Applicant has provided the website that was modified on Sep. 19, 2011, 7 pages.
Web site of The Site Box, http://www.thesitebox.com/Category/4889/double-worm-screw.aspx, Copyright date of 2010, 2 pages.
"Cast iron" (in Japanese), "Casting database" in "Processing technology database" from the web site of the National Institute of Advanced Industrial Science and Technology (AIST), available in some form no later than Feb. 23, 2011. http://mono.muse.aist.go.jp/mono/db-dmrc/casting/gairon/text_06.htm.
"Diagram of production process of graphite electrodes", from the web site of Tokai Carbon Co., Ltd. (in Japanese), http://www.tokaicarbon.co.jp/products/graphite/process.html, and http://www.tokaicarbon.co.jp/en/products/graphite/introduction.html, available in some form no later than Feb. 23, 2011. While the website as it existed on Feb. 23, 2011 is not in Applicant's possession, Applicant has provided the website that was printed on Jan. 4, 2012, 4 pages.
Drilling Machine. http://www2.odn.ne.jp/~mikawakikai/page005.html, available in some form no later than Feb. 23, 2011. While the website as it existed on Feb. 23, 2011 is not in Applicant's possession, Applicant has provided the website that was printed on Jan. 17, 2012, 4 pages.
"Electrode paste for solar cells", from the web site of Noritake Co. Limited (in Japanese), http://www.noritake.co.jp/company/press/2008/02/maxsunny.html; Ag electrode paste for solar cells, http://www.noritake.co.jp/eng/products/ceramic/paste/thick_film/lineup.html; available in some form no later than Feb. 23, 2011.
Inaba, Masamitsu. "Strength and breakage of metallic material", Powerpoint presentation and notes from Summer training workshop for teachers for science in junior high schools run by Fuji City: Experiments/practical training; on Aug. 10, 2007. Document found at http://yth.town-web.net/paper_essay/Inaba-on-metal/MINABA-report-on-metal.htm, While these are website documents, and the original date of publication and contents of the publication are unknown, some version of the website was available prior to Aug. 26, 2011.
"Machine", from web site of Hokushin Sangyo Co., Ltd. (in Japanese), http://www.hokusins.co.jp/machine/, available in some form no later than Feb. 23, 2011, While the website as it existed on Feb. 23, 2011 is not in Applicant's possession, Applicant has provided the website that was printed on Jan. 17, 2012, 3 pages.
"Mitsubishi crawler drill MCD10 II", http://www.ems-esd.co.jp/lineup/mitsubishi/mcd102.html, While these are website documents, and the original date of publication and contents of the publication are unknown, some version of the website was available prior to Aug. 26, 2011.
Niinae et al., "Effect of Electrode Configuration on Cleanup Efficiency of Heavy metals by Electrokinetic Soil Remediation," Resource Processing 53: pp. 49-57, 2006.
Web site of Tech Plaza Higashiosaka, "Antioxidant Corruption Prevention System," http://www.techplaza.city.higashiosaka.osaka.jp/word/lost_wax_process.html, available in some form no later than Feb. 23, 2011, While the website as it existed on Feb. 23, 2011 is not in Applicant's possession, Applicant has provided the website that was printed on Jan. 17, 2012, 2 pages.

* cited by examiner

FIG. 5

ELECTRO-REMEDIATION

REFERENCE TO RELATED APPLICATIONS

This application is the U.S. National Phase entry under 35 U.S.C. §371 of International Application PCT/US2011/056012, filed Oct. 12, 2011, entitled "ELECTRO-REMEDIATION," the entirety of which is incorporated herein by reference.

FIELD

The present application relates generally to soil decontamination.

BACKGROUND

Soil contamination is caused by the presence of non-naturally occurring substances in the natural soil environment. The contamination can be caused by any number of things, for example, leakage from underground storage tanks, usage of pesticides, percolation of contaminated surface water to subsurface strata, oil and fuel dumping, leaching of water from landfills or direct discharge of industrial wastes to the soil. The most common substances found to contaminate soil include petroleum hydrocarbons, solvents, pesticides, lead and other heavy metals. Soil contamination presents health risks from the contact with the contaminated soil and contaminant vapors and from contamination of water supplies within the soil. Soil contamination may also have detrimental effects on ecosystems and agricultural lands. For at least these reasons, soil decontamination becomes necessary.

SUMMARY

In some embodiments, an apparatus for collecting metal is provided. The apparatus can include at least a first helically shaped electrode. The apparatus can also include a second electrode. The second electrode can serve as an anode while the second electrode can serve as a cathode or the first electrode can serve as a cathode while the second electrode can serve as an anode.

In some embodiments, a method for decontaminating soil is provided. The method includes inserting an apparatus into soil. The apparatus includes a first helically shaped electrode and a second electrode, wherein the second electrode is electrically isolated from the first electrode. The method further includes applying an electrical current to the apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, an apparatus for collecting metal is provided. The apparatus can include a first helically shaped electrode. In some embodiments, the apparatus further includes a second electrode, electrically isolated from the first electrode, so that the first electrode can serve as an anode while the second electrode can serve as a cathode or so that the first electrode can serve as a cathode while the second electrode can serve as an anode. In some embodiments, the second electrode can also be helically shaped. In some embodiments, the first and second electrodes can be combined such that together they form a double (or higher order) helix. In some embodiments, an end of the apparatus is configured to be inserted into a material to be treated by electro-remediation. In some embodiments, electrical current can be applied to the apparatus. In some embodiments, the electrical current can cause metals (ions thereof, or any adequately charged particles) in the material to become attracted to the first helically shaped electrode, the second electrode, or both. In some embodiments the helix can be coiled in a clockwise direction as one passes down the length of the helix. In some embodiments the helix can be coiled in a counter-clockwise direction as one passes down the length of the helix.

Figure 1:
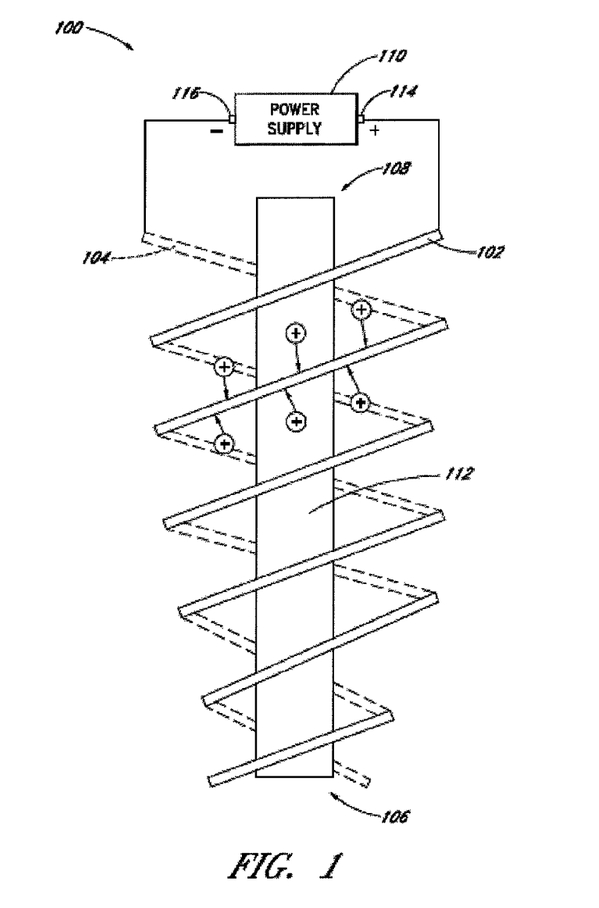
FIG. 1 is a drawing depicting some embodiments of an apparatus for collecting metal.

FIG. 1 depicts an embodiment of an apparatus 100 for collecting metal from a material. In some embodiments, the apparatus is used in electro-remediation methods. In some embodiments, the apparatus includes a first helically shaped electrode 102, and a second electrode 104. In some embodiments, the second electrode 104 is electrically isolated from the first electrode 102 so that the first electrode 102 can serve as an anode while the second electrode can serve as a cathode 104 or so that the first electrode 102 can serve as a cathode while the second electrode 104 can serve as an anode. While the second electrode 104, is depicted in FIG. 1 as a second helical electrode, it does not need to be in all embodiments. For example, in some embodiments, the second electrode is mechanically isolated from the first electrode (thereby removing the second electrode from FIG. 1). In some embodiments, the second electrode can be a positioned in the center of the first helical electrode 102.

In some embodiments, the apparatus 100 includes more than a first electrode 102 and a second electrode 104. For example the apparatus 100 can include a third and a fourth electrode. Considering the balance of electrodes, in some embodiments it can be advantageous for the apparatus 100 to include an even number of electrodes.

As shown in FIG. 1, in some embodiments, the second electrode 104 can be at least partially helically shaped. A helically shaped first electrode 102 and/or second electrode 104 can advantageously increase the strength of the electrode and enable the electrode to be easily and deeply inserted into soil or other material to be treated. In some embodiments, the first electrode 102 and the second electrode 104 are substantially similarly shaped, including substantially similar radii, pitches, and lengths. In some embodiments, the first electrode 102 and the second electrode 104 are not similarly shaped, and can include different radii, pitches, and lengths. In some embodiments, at least one of the radius, pitch and length of the first electrode 102 is substantially similar to the corresponding attribute of the second electrode 104. In some embodiments, other shapes for the second electrode 104 are also possible. For example, in some embodiments the second electrode 104 may be in the shape of a rod or a plate.

In some embodiments, the radius of at least one of the first electrode 102 and the second electrode 104 is between about 0.01 to 5 meters, for example 0.01, 0.1, 0.2, 0.3, 0.4, 0.5, 0.6, 0.7, 0.8, 0.9, 1, 2, 3, 4, 5, or more meters, including any range above or below any one of the preceding values and any range defined between any two of the preceding values. In some embodiments, the radius of at least one of the first electrode 102 and the second electrode 104 remains constant along the length of the electrode. In some embodiments, the radius of at least one of the first electrode 102 and the second electrode 104 varies along the length of the electrode. In some embodiments, the length of at least one of the first electrode 102 and/or the second electrode 104 is between about 0.1 and 500 meters, for example 0.1, 0.2, 0.3, 0.4, 0.5, 0.6, 0.7, 0.8, 0.9, 1, 2, 3, 4, 5, 10, 20, 30, 50, 100, 200, 300, 400, or 500 meters, including any range above or below any of the preceding values and any range defined between any two of the preceding values. In some embodiments, where deeper metal removal is desired, the apparatus can be connected to an extender, so that deeper depths can be achieved. While the extender need not be conducting, or serve as an electrode, in some embodiments, it can be conducting, so as to simplify electrical transfer to the first electrode. In some embodiments, increasing the radius and/or length of the first electrode 102 and the second electrode 104 may advantageously allow decontamination over a large area of soil or other material. In some embodiments, the pitch of at least one of the first electrode 102 and the second electrode 104 is between about 0.01 to 5 meters, for example 0.01, 0.05, 0.1, 0.2, 0.3, 0.4, 0.5, 0.6, 0.7, 0.8, 0.9, 1, 2, 3, 4, or 5 meters, including any range above or below any of the preceding values and any range defined between any two of the preceding values. In some embodiments, the lead or traveling length per revolution of at least one of the first electrode 102 and the second electrode 104 is between about 0.02 to 10 meters, for example 0.02, 0.05, 0.1, 0.2, 0.3, 0.4, 0.5, 0.6, 0.7, 0.8, 0.9, 1, 2, 3, 4, 5, 6, 7, 8, 9, or 10 meters, including any range above or below any of the preceding values and any range defined between any two of the preceding values. In some embodiments, a large lead can advantageously allow for quick insertion into and removal from soil or other material to be treated. In some embodiments, the pitch of at least one of the first electrode 102 and the second electrode 104 remains substantially constant along the length of the electrode. In some embodiments, the pitch of at least one of the first electrode 102 and the second electrode 104 varies along the length of the electrode. In some embodiments, the entirety of the first and/or second electrode is helical. In some embodiments, less than all of the first and/or second electrodes are helical, for example, 99.99, 99.9, 99, 98, 97, 96, 95, 90, 80, 70, 60, 50, 40, 30, 20, 10, 5, 4, 3, 2, or 1 percent of the first and/or second electrode can be helical.

In some embodiments, at least a portion of the first electrode 102 is wrapped around a portion of the second electrode 104 (e.g., as shown in FIG. 1). In some embodiments, substantially the entire first electrode 102 is wrapped around a portion of the second electrode 104. In some embodiments, the first electrode 102 is wrapped around at least a portion of a helically shaped second electrode 104. Other configurations are also possible. In some embodiments, the first electrode can be tightly wound around at least a portion of the second electrode, including having a small pitch. In some embodiments the first electrode can be loosely wound around the second electrode, including having a large pitch.

In some embodiments, the apparatus 100 includes alternating sections of the first electrode 102 and the second electrode 104 along a length (for example, from the top of the apparatus in FIG. 1 to the bottom) of the apparatus 100. In some embodiments, alternating sections of the first electrode 102 and the second electrode 104 are formed by the first electrode 102 being wound "around" or with the second electrode 104. In some embodiments, the alternating sections of the first electrode 102 and the second electrode 104 are formed by the first electrode 102 and the second electrode 104 being wound around each other. Other configurations for the alternating sections of the first electrode 102 and the second electrode 104 are also possible. For example, in some embodiments the second electrode can include a rod including a surface of alternating insulator and electrode material and the first electrode 102 may be wrapped around the second electrode 104.

In some embodiments, the helically shaped first electrode 102 and the helically shaped second electrode 104 can form a double helix shape. Double helices generally include two, typically congruent, helices with a substantially same axis, different by a translation along the axis. In some embodiments, the double helix shape formed by the first electrode 102 and the second electrode 104 may not necessarily include two congruent helices. For example, the first electrode 102 and the second electrode 104 can include different lengths, radii, or pitches. Furthermore, the double helix shaped formed by the first electrode and the second electrode 104 may not necessarily include the same axis. However, the general shape of the double helix embodiment resembles that of a double helix. In some embodiments, the first electrode 102 and the second electrode 104 forms the shape of a left-handed double helix. In some embodiments, the first electrode 102 and the second electrode 104 form the shape of a right handed double helix. In some embodiments, the apparatus includes more than the first electrode 102 and the second electrode 104, e.g., the apparatus 100 can include a multi-helix shape, having three or more helices (e.g., 3, 4, 5, 6, 7, 8, 9, 10, 50, 100 or more helices).

In some embodiments, the first electrode 102 is in electrical communication with a positive terminal 114 of a power source 110 and the second electrode is in electrical communication with a negative terminal 116 of a power source 110. In some embodiments, the first electrode is in electrical communication with a negative terminal 116 of a power source 110 and the second electrode is in electrical communication with a positive terminal 114 of a power source 110. In some embodiments the first electrode 102 serves as an anode and the second electrode 104 serves as a cathode. In some embodiments, the first electrode 102 serves as a cathode and the second electrode 104 serves as an anode.

In some embodiments, an end 106 of the apparatus is configured so as to allow insertion of the apparatus into soil or another material to be treated. In some embodiments, the end 106 of the apparatus 100 is tapered to allow insertion into soil or another material. In some embodiments, the helically shaped first electrode 102 includes a radius at the end 116 of the apparatus that is smaller than the radius of the electrode 102 away from the end 116. In embodiments in which the second electrode 104 includes a helical shape, the second electrode 104 can include a smaller radius at the end 116 of the apparatus 100 than the radius away from the end 116. In some embodiments, a portion of the apparatus 100 not including the first electrode 102 or the second electrode 104 is tapered. For example, the first electrode 102 and the second electrode 104 can be wound around a separate support structure 112 which can extend past the electrodes at the end 116 of the apparatus and include a tapered shape. Other shapes for the end 116 of the apparatus are also possible. For example, the apparatus 100 can include a structure at the end 116 with a smaller cross-sectional area than that of the remainder of the apparatus 100. For example, the apparatus can include a cylinder at the end 116 with a smaller-cross sectional area than that of the remainder of the apparatus. In some embodiments, the end 116 of the apparatus 100 is threaded to aid in insertion of the apparatus 100. In some embodiments, the helix changes its diameter gradually from small to large. In some embodiments, this makes a cone-shape when viewed from the side. Such an embodiment could be inserted into the ground small-end first or large-end first.

In some embodiments, the end 116 of the apparatus 100 can include at least one of a number of materials. In some embodiments, the end 116 of the apparatus 100 includes iron, cast iron, carbon steel, or other material suitable for drilling though a desired material. Other materials, such as high-speed steel, titanium, carbon-fiber reinforced polymer (CFRP), glass fiber reinforced polymer (GFRP), and any material that can be conductive bear the forces and, optionally, environmentally friendly, are also possible. Materials with high tensile strength and yield strength can be capable of bearing the mechanical pressure applied to the apparatus 100 during insertion of the apparatus 100 into soil or other material.

In some embodiments, the apparatus 100 further includes a motor configured for and capable of rotating the helically shaped electrode for insertion and removal of the helically shaped electrode from soil or other material. Rotating the helically shaped electrode can cause the electrode to be inserted into the material to be treated. Rotating the helically shaped electrode in a direction opposite from that used during insertion can cause the electrode to be removed from the material to be treated or the treated material. In some embodiments, the motor includes a drill, such as a crawler drill. Other drills, such as a pneumatic drill, are also contemplated. The motor used to insert the apparatus 100 can be selected, taking into consideration, aspects of the soil or material contamination, the depth and area of the soil or material requiring decontamination, and the soil or material properties. In some embodiments, a self-propelled boring machine is used for insertion. In some embodiments, a machine having arrayed drills can be used for insertion. In some embodiments, an auger, or earth auger, for digging soil, can be used. In some embodiments, if the soil is very soft, such as smooth sand or mud, axial vibration could be also available instead of rotation force. In some embodiments, a vibratory hammer can be employed. In some embodiments, the device can be inserted by axial force because of the mechanism of screw shape. Axial force induces the rotational movement of the apparatus and soil. In some embodiments, a pilling or pressing machine can be employed.

In some embodiments, the apparatus 100 further includes a device 110 for controlling a voltage across the first electrode 102 and the second electrode 104. In some embodiments, the device 110 includes a voltage generator. Other devices, such as batteries or power sources, are also possible. The voltage applied can be selected taking into consideration the shape of the first electrode 102 and the second electrode 104, the material of the first electrode 102 and the second electrode 104, and the distance between the first electrode 102 and the second electrode 104. In some embodiments, the electric field intensity can be adjusted by the device 110. In some embodiments, the treatment rate of the soil or other material can be increased in proportion to the electric field intensity between the first electrode 102 and the second electrode 104. In some embodiments, the electric field intensity can be at least about 10 V/m, at least about 50 V/m, at least about 100 V/m, at least about 120 V/m, at least about 130 V/m, at least about 140 V/m, at least about 150 V/m, at least about 160 V/m, or at least about 200 V/m. Other electric field intensities are also possible.

In some embodiments, the first electrode 102 includes a ribbon, a wire, or both and the second electrode 104 includes a ribbon, a wire, or both. In some embodiments, at least a portion of the first electrode 102 includes a ribbon and at least a portion of the second electrode 104 includes a ribbon as depicted in FIG. 1. In some embodiments, at least a portion of the first electrode 102 includes a ribbon and at least a portion of the second electrode 104 includes a wire. In some embodiments, at least a portion of the first electrode 102 includes a wire and at least a portion of the second electrode 104 includes a ribbon. In some embodiments, at least a portion of the first electrode 102 includes a wire and at least a portion of the second electrode 104 includes a wire. Other configurations are also possible. For example, at least a portion of the second electrode 104 can include a rod and at least a portion of the first electrode 102 can include a ribbon wound around the rod including the second electrode 104.

In embodiments in which at least one of the first electrode 102 and the second electrode 104 includes a ribbon, the width of the ribbon may be between about 0.01 and 5 meters. In embodiments in which at least one of the first electrode 102 and the second electrode 104 includes a ribbon, the thickness of the ribbon may be between about 1 to 1,000 mm. In embodiments in which at least one of the first electrode 102 and the second electrode 104 includes a wire, the diameter of the wire may be between about 1 mm to 1 m, e.g., 1, 5, 10, 20, 40, 50, 100, 200, 400, 500, or 1000 mm, including any range above or below any one of the preceding values and any range defined between any two of the preceding values.

In some embodiments, the apparatus 100 further includes an insulating material positioned between at least a portion of the first electrode 102 and the second electrode 104. In some embodiments, an insulating material can prevent short-circuiting of the apparatus 100. In some embodiments, the apparatus 100 includes an insulating material at a node at an end 108 of the devices that joins the first electrode 102 and the second electrode 104. In some embodiments, the apparatus 100 includes an insulating rod 112 positioned between a helically shaped first electrode 102 and a helically shaped second electrode 104. Other configurations for an insulating material are also possible. For example, in some embodiments, the apparatus 100 includes an insulating material at the joints at which the first electrode 102 and the second electrode 104 contact the other components of the apparatus 100.

The insulating material can include one of a number of materials. In some embodiments, the insulating material includes silicone, silicone resin, silicone rubber, ceramic, or a rubber. Other insulating materials are also possible. For example, in some embodiments, the insulating material includes a polymer, such as polyetherketone, polyimide, polyamide imide, a carbonate polymer, polybutylene terephthalate, polyethylene terephthalate, polysulfone, epoxy, carbon-fiber-reinforced polymer, a fluorinated polymer, or any combination thereof.

In some embodiments, the apparatus 100 further includes a support structure 112, wherein the first electrode 102 is connected to the support structure 112, and wherein the second electrode 104 is connected to the support structure. In some embodiments, the support structure 112 includes a rod and the first electrode 102 and the second electrode 104 are wound around the rod as shown in FIG. 1. In some embodiments, the support structure includes a joint at one or both ends 106, 108 of the apparatus 100 from which the first electrode 102 and the second electrode 104 extend. Other configurations for the support structure are also possible. For example, the support structure may be a rod with the second electrode 104 joined to the rod and the first electrode 102 may be wound around both the rod and the second electrode 104.

In some embodiments, the first electrode 102 is connected to the support structure 112 via an insulator. In some embodiments, the second electrode 104 is connected to the support structure 112 via an insulator. In some embodiments, the first electrode 102 and the second electrode 104 are connected to the support structure 112 via an insulator. For example, the joints connecting the first electrode 102 and the second electrode 104 to the rod or support structure 112 may include an insulating material. For another example, the rod or support structure 112 itself may include an insulating material. Other configurations are also possible. For example, in some embodiments, a support structure 112 joining the first electrode 102 and the second electrode 104 at an end of the apparatus 100 may be connected to one of the first electrode and the second electrode via an insulator.

As discussed above, in some embodiments, the support structure 112 includes a rod shape. In some embodiments, at least a portion of the rod 112 is solid. In some embodiments, substantially the entire rod 112 is solid. In some embodiments, at least a portion of the rod 112 is hollow. In some embodiments, substantially the entire rod 112 is hollow. In certain embodiments in which the rod 112 is hollow, the rod 112 includes apertures configured to allow a solution to pass therethrough. In some embodiments, the solution passed through the apertures includes an pH control solution, such as acids or alkalines. Other solutions, such as electrolyte solutions, are also possible. In some embodiments, the apertures may be configured to supply solution to only the first electrode 102 or to only the second electrode 104. Supplying the solution to only the first electrode 102 or only the second electrode 104 may advantageously allow for adjustment of the pH of the electrodes 102, 104 and the support structure 112 to aid in facilitating the removal of metals from the soil or other material. In some embodiments, one or both of the first electrode 102 and the second electrode 104 is hollow and includes apertures configured to allow solutions, such as those described above, to pass therethrough.

In some embodiments, at least one of the first electrode 102 and the second electrode 104 includes carbon, silver, platinum (e.g., meshed platinum), or iron. In some embodiments, the electrode including the anode includes carbon (e.g., carbon nanotube, fullerenes, diamond, etc.) or silver. In some embodiments, the electrode including the cathode includes platinum. Other materials, such as gold, are also possible; however, it may not be desirable to use metals, such as copper or aluminum, which may elute and cause further contamination of the material to be treated.

In some embodiments, each of the first electrode 102 and the second electrode 104 is produced independently. In some embodiments, one or both of the first electrode 102 and the second electrode 104 is produced by pouring material into a mold of a desired shape. Other production methods, such as casting, carbon steel casting, iron casting, or sheet metal processing, are also possible. Casting may advantageously enable low-cost mass production of components having a complex shape. In some embodiments, one or both of the first electrode 102 and the second electrode 104 may be monolithically formed from electrode material such as those described above (e.g., iron). In some embodiments, an inner structure of one or both of the first electrode 102 and the second electrode 104 may be initially formed from material such as iron, cast iron, or carbon steel. Other materials, such as high-speed steel, titanium, and other materials denoted herein are also possible. Materials including a high tensile strength and/or yield strength may advantageously be capable of bearing the mechanical pressure applied during insertion of the apparatus 100. Electrode material may then be placed on the surface of the inner structure. For example, the electrode material may be a separate structure joined to the surface of the inner structure. In some embodiments, the electrode material is applied to the inner structure as a paste. Electrode material applied as a paste may advantageously be applied again after wearing off, simplifying maintenance of the apparatus 100. In embodiments of the apparatus 100 including a support structure such as a rod 112, the first electrode 102 and the second electrode 104 may be joined to the support structure 112 (e.g., using fasteners, bolts, welds, etc.). As discussed above, insulating material can be inserted between the electrodes 102, 104 during fastening to reduce short-circuiting of the apparatus 100.

Figure 2:
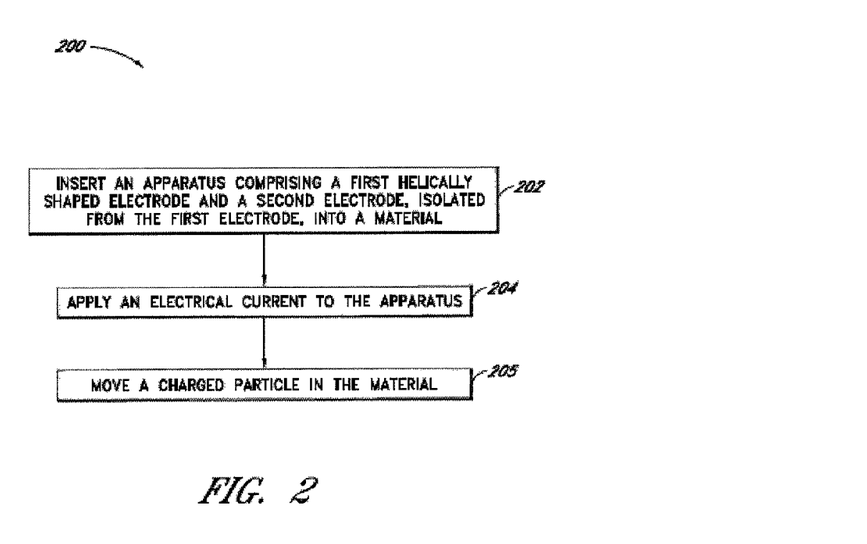
FIG. 2 is a flow chart depicting some embodiments of a method for decontaminating a material.

FIG. 2 is a flow chart depicting an embodiment of a method 200 for decontaminating a material. The method 200 can include inserting an apparatus including a first helically shaped electrode and a second electrode (which need not be helical, but is isolated electrically from the first electrode), into a material 202, such as soil. The method can further include applying an electrical current to the apparatus 204. In some embodiments this will move charged particles from a first location in the material to a new location, based on the electrical current applied, block 205. In some embodiments, a adequate charge is applied so as to attract and/or attach the charged particles to an oppositely charged electrode.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, inserting the apparatus 100 includes applying a rotational force to the apparatus 100. The rotational force can serve to screw at least the first helically shaped electrode into the soil or other material. The rotational force can serve to screw the entire apparatus 100 into the soil or other material. In some embodiments, inserting the apparatus 100 includes applying a downward force to the apparatus 100. In some embodiments, inserting the apparatus 100 is performed manually. In some embodiments, inserting the apparatus 100 is performed using a drill, such as a crawler drill. Other drills, such as a pneumatic drill, are also contemplated. The motor used to insert the apparatus 100 can be selected taking into consideration the level of soil or material contamination, the depth and area of the soil or material requiring decontamination, and the soil or material properties. In some embodiments, a self-propelled boring machine is used for insertion. In some embodiments, any of the other devices provided herein (e.g., vibro hammers, etc. can be employed).

In some embodiments, the method 200 further includes removing the first helically shaped electrode from the soil or other material. In some embodiments, removing the first helically shaped electrode from the soil or other material causes the apparatus to be removed from the soil or other material. In some embodiments, removing the first helically shaped electrode from the soil or other material includes applying a rotational force opposite from the force used to insert the first helically shaped electrode into the soil or other material. In some embodiments, removal includes applying an upward force to the apparatus. In some embodiments, the removal is performed manually. In some embodiments, the removal is performed using a drill, such as the drills discussed with respect to insertion above. In some embodiments, the same drill is used to insert and remove the first helically shaped electrode into the soil or other material. In some embodiments, one drill is used to insert the first helically shaped electrode and a different drill is used to remove the first helically shaped electrode from the soil or other material.

In some embodiments, applying the electrical current includes using the first electrode as a cathode and using the second electrode as an anode. In some embodiments, applying the electrical current includes using the first electrode as an anode and using the second electrode as a cathode. In some embodiments, applying an electrical current to the apparatus causes metal ions into the soil or other material to become attracted to the first helically shaped electrode 102, the second electrode 104, or both. In some embodiments, once the apparatus is inserted in soil or other material to be treated, the soil or other material may enter the space between the first electrode and the second electrode. After applying the electrical current, metal ions in the material, having a positive charge, may move towards the negative electrode of the apparatus and be adsorbed. In some embodiments, the adsorbed metal ions can be reduced by receiving electrons from the first electrode or the second electrode (e.g., the electrode acting as the cathode). In some embodiments, the metals can become fixed to the first electrode or the second electrode and may then be removed along with the electrodes.

When a voltage is applied to a system including a solid phase (soil or other material) and a liquid phase (moisture in the soil or other material), charge separation can occur at the boundary of the solid and the liquid, and an electric double layer can be formed. For example, when the zeta potential of the soil or other material is negative, by applying a DC voltage to the moisture, it can be weakly and positively charged, and an electro-osmotic flow can occur. As a result, ions of metals in the soil or other material can be gathered at the cathode and/or anode. On a scale at which the moisture in the soil or other material almost does not move, the heavy metal ions can move through the soil or other material, a phenomenon known as electrophoresis. Depending on the relative distances and the intensities of the voltages among the material, the moisture, and the electrodes, either electro-osmosis and/or electrophoresis may occur. Since the material particles can vary in size, it is presumed that electro-osmosis and electrophoresis actually can occur simultaneously.

In some embodiments, the method 200 further includes removing the metals fixed to the surface of the electrode(s). Removal of the metals can be performed by re-ionizing the ions through electrolysis in electrolytes, chemically removing the ions by acids, and/or physically removing the metals by mechanical grinding and/or shot blasting. Other removal methods, such as discarding the metals along with the electrodes, are also possible.

In some embodiments, the method 200 further includes pre-processing the soil or other material to prepare it for the removal of metal contaminants. Pre-processing can include spraying water (e.g., water containing electrolytes), applying vibrations, and/or breaking up the soil (e.g., using explosives). Pre-processing can facilitate the removal of metals. For example, spraying water on the soil or other material may advantageously promote the movement of ions. Other pre-processing steps, such as spraying pH control solutions, are also possible.

As discussed above, in some embodiments, the method 200 further includes applying a solution including at least an electrolyte, a pH control solution, or both to the soil or other material. In some embodiments, the solution is applied directly to the soil or other material, such as during pre-processing. In some embodiments, the solution is applied by flowing the solution through the apparatus 100 when the apparatus 100 is inserted into the soil or other material. In such embodiments, the apparatus 100 may include apertures configured to pass solution therethrough.

Figure 3:
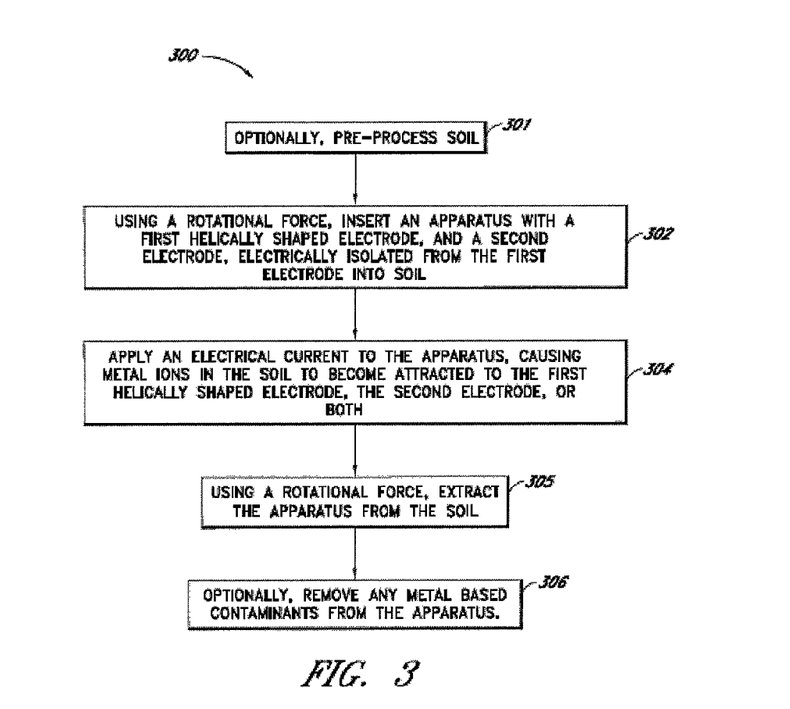
FIG. 3 is a flow chart depicting some embodiments of a method for decontaminating soil.

FIG. 3 depicts another embodiment of a method 300 for decontaminating a material (e.g., soil). The method 300 will be described with respect to the apparatus 100 depicted in FIG. 1. As an optional process, the soil to be treated can be pre-processed block 301 as described above. In some embodiments, one can use a rotational force to insert the apparatus of FIG. 1 (including a first helically shaped electrode 102 and a second electrode 104 electrically isolated from the first electrode 102) into soil, as shown in block 302. The method 300 can include then applying an electrical current to the apparatus to cause an electrical potential between the first and second electrodes, as shown in block 304. In some embodiments, one can then use a second rotational force, opposite in direction of the first rotational force, to extract the apparatus (in particular at least one if not two or more electrodes) from the soil, as shown in block 305. In some embodiments, one can then, optionally, remove any metal contaminants from the removed electrode, as shown in block 306.

In some embodiments, any of the methods herein can be performed on soil where there is little liquid. In some embodiments, additional liquid can be added to the material or soil to be treated. In some embodiments, the soil is near a body of water or liquid.

Figure 4:
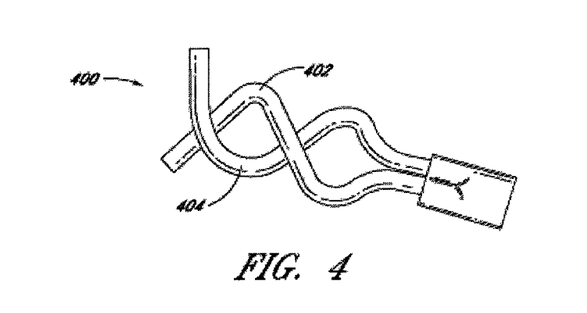
FIG. 4 is a drawing depicting some embodiments of an apparatus having a first helical electrode and a second helical electrode.

FIG. 4 depicts a portion of an embodiment of an apparatus 400 for collecting metal from a material. In some embodiments, the apparatus includes a first helically shaped electrode 402 and a second electrode 404. In some embodiments, the second electrode 404 is electrically isolated from the first electrode 402 so that the first electrode 402 can serve as an anode while the second electrode 404 can serve as a cathode or so that the first electrode 402 can serve as a cathode while the second electrode 404 can serve as an anode. The second electrode 404 can also be helically shaped as shown in FIG. 4.

Figure 5:
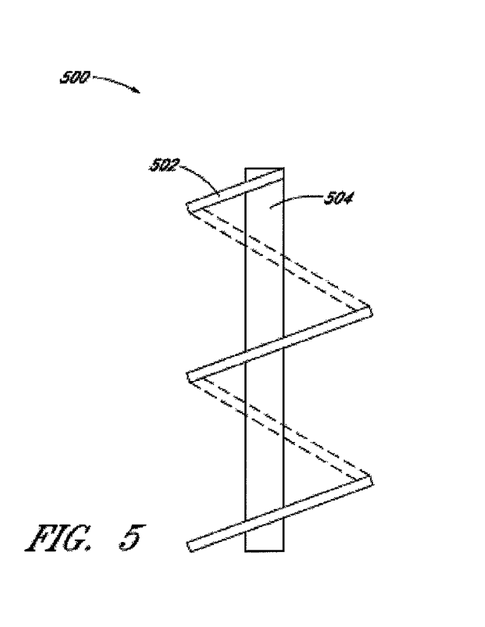
FIG. 5 is a drawing depicting some embodiments of an apparatus having a first helical electrode and a second electrode.

In some embodiments, the arrangement can be different. For example, FIG. 5 depicts an embodiment of the apparatus 500 in which the second electrode 504 can be rod shaped. The first electrode 502 and the second electrode 504 can be mechanically joined at one or more point along the apparatus, although they can be kept physically separated as well. In some embodiments, the two electrodes will still be electrically separated between one another. In some embodiments, the joint connecting the first electrode 502 and the second electrode 502 can include an insulating material. In some embodiments, the first electrode 502 can be wrapped around at least a portion of a rod shaped second electrode 504. In some embodiments, the second electrode can be wrapped around at least a portion of a rod shaped first electrode. In some embodiments, when one of the electrodes is positioned within the volume created by the other electrode, enough distance can be between the two electrodes so as to allow adequate electrical separation between the two electrodes. In some embodiments, the rod shaped electrode is positioned outside of the helix of the other electrode that is helical in shape. In some embodiments, when one electrode runs along the length of the helix of the other electrode, the non helical electrode can be straight, angled, bent, or curved.

Current, conventional methods for removing metals from contaminated soil and groundwater by electrical treatment includes the steps of inserting flat electrodes in situ into the soil or inserting electrodes into soil that has been transferred to a box and then causing the soil to adhere to the electrodes and removing the heavy metals by electro-osmosis or electrophoresis. In some embodiments, methods or an apparatus provided herein allows remediation without the use of flat electrodes in situ or transferring the soil to a box and/or off site. In some embodiments, electro-remediation can be achieved by using a single insertion device. That is, in some embodiments, each electrode does not need to be a separate structure, but rather both electrodes can be part of the same structure, such that insertion of a single structure into the material is adequate to set up the potential difference. Some of the embodiments provided herein allow for ease of decontamination of deep soil. For example, while some soil treatment methods might treat soil over an area of 200 m2 and up to a depth of 50 cm as provided in U.S. Pat. No. 5,433,829, there is no real limitation as to the depth and area of treatment for the present apparatus, apart from drilling (e.g., insertion) ability. In some embodiments, soil can be treated at depths greater than 0.5 m, and/or without removing the soil from its current environment, e.g., depths of 0.5, 0.6, 0.7, 0.8, 0.9, 1, 2, 3, 4, 5, 6, 7, 8, 9, 10, 15, 20, 30, 40, 50, 60, 70, 80, 90, 100, 200, 300, 400, 500, 1000 meters or more, including any range above any of the preceding values and any range between any two of the preceding values. In some embodiments, when depths of greater than 100 m are desired, the material can be bored before the insertion of the device.

In some embodiments, the apparatuses and/or methods provided herein can allow the electrodes to be easily and deeply inserted into the soil or other material. In some embodiments, the single or double helical structure of the electrode can aid in insertion and can allow the electrodes to be deeply inserted into material to be treated. In some embodiments, deep insertion is possible while keeping the distance between the electrodes small. In this way, an electrical field having a large potential gradient can be generated in a large area of material, and electrical decontamination of the material can be efficiently performed. Reducing the distance between the electrodes can also reduce the driving voltage required to produce a particular voltage across the electrodes. In some embodiments, this can result in lower power consumption. In some embodiments, this can reduce costs of the treatment, make the treatment more environmentally friendly, and make the treatment safer. Furthermore, in some embodiments, the methods and apparatuses provided herein do not depend on the properties of the soil or material to be treated. By selecting different types of electrodes having different hardnesses in accordance with the material properties, soil having a wide range of characteristics can be treated.

EXAMPLES

Example 1

Decontamination of Sand Using Double Helix Apparatus

The present example outlines a method for sand decontamination. The apparatus includes a first helically shaped electrode including silver and a second helically shaped electrode including platinum. The first and second electrodes are cylindrical in shape (as shown in FIG. 4) and are arranged in a double helix formation. The first and second electrodes are joined at one end by a solid support structure. The connection between the support structure and the electrodes includes an insulating material, silicone. The apparatus is approximately 1 m in length and has a radius of approximately 0.3 m. The sand to be treated is pre-processed by applying vibrations to the sand. A drill is used to apply a rotational force to the apparatus to insert it into the sand to be treated. After insertion, the first electrode is put in electrical communication with a positive terminal of a power source and the second electrode is put in electrical communication with a negative terminal of a power source. Once the apparatus has been inserted into the sand, an electrical current is applied to the apparatus using the power source. An electric field intensity of 170 V/m is applied to the apparatus for 2 hours. The application of current causes positively charged metal ions within the sand to become fixed to the second electrode. The apparatus, along with the metals fixed to it, is then removed from the sand using the crawler drill, thereby decontaminating the sand.

Example 2

Decontamination of Soil Using a Double Helix Apparatus

An apparatus for decontaminating a material is used to decontaminate a volume of soil. The apparatus includes a first helically shaped electrode including gold and a second helically shaped electrode including platinum. The first and second electrodes are wrapped around a support structure in the form of a rod including cast iron (as generally shown in FIG. 1). The inner structure of the first and second electrodes also includes cast iron. The first and second electrodes are joined to the rod by an insulating material, carbon-fiber-reinforced polymer. The rod includes apertures configured to allow a solution to pass therethrough. The apparatus is approximately 30 m in length and approximately 1 m in diameter. The end of the apparatus is tapered to facilitate insertion into the soil. A crawler drill is used to apply a rotational force to the apparatus to insert it into the soil to be treated. Once the apparatus has been inserted into the soil, an electrical current is applied to the apparatus using the power source. An electric field intensity of 150 V/m is applied to the apparatus. The application of current causes metal ions within the soil to become fixed to the negatively charged electrode. Electrolyte solution is passed through the apertures in the rod to facilitate the collection of metals. The apparatus, along with the metals fixed to it, is then removed from the soil using the crawler drill, decontaminating the soil.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus to collect metal, the apparatus comprising:
a first electrode that is helically shaped; and
a second electrode, wherein the second electrode is electrically isolated from the first electrode so that the first electrode can serve as an anode while the second electrode can serve as a cathode or so that the first electrode can serve as a cathode while the second electrode can serve as an anode,
wherein the first electrode and the second electrode are configured at bottom ends to comprise a material suitable to be drilled through soil, and
wherein the first electrode and the second electrode are configured to bear mechanical pressure applied to the apparatus while being drilled into soil, so as to allow insertion of the apparatus into soil.

2. The apparatus of claim 1, wherein the second electrode is helically shaped.

3. The apparatus of claim 2, wherein at least a portion of the first electrode is wrapped around a portion of the second electrode.

4. The apparatus of claim 3, wherein the first electrode and the second electrode are wrapped around each other from a top portion of the electrodes to a bottom portion of the electrodes.

5. The apparatus of claim 4, wherein the first electrode and the second electrode, which are helically shaped, form a double helix.

6. The apparatus of claim 5, wherein the double helix is a left-handed double helix.

7. The apparatus of claim 5, wherein the double helix is a right-handed double helix.

8. The apparatus of claim 1, wherein the first electrode is in electrical communication with a positive terminal of a power source and the second electrode is in electrical communication with a negative terminal of the power source.

9. The apparatus of claim 1, wherein the bottom ends of the first electrode and the second electrode are tapered in shape.

10. The apparatus of claim 1, further comprising a motor configured and capable to rotate the first electrode for insertion and removal of the first electrode from soil.

11. The apparatus of claim 1, further comprising a device configured to control a voltage across the first electrode and the second electrode.

12. The apparatus of claim 1 wherein the first electrode comprises a ribbon, a wire, or both and the second electrode comprises a ribbon, a wire, or both.

13. The apparatus of claim 1, further comprising an insulation material positioned between at least a portion of the first electrode and the second electrode.

14. The apparatus of claim 1, further comprising a support structure, wherein the first electrode is coupled to the support structure, and wherein the second electrode is coupled to the support structure.

15. The apparatus of claim 14, wherein the first electrode is coupled to the support structure via an insulator.

16. The apparatus of claim 15, wherein the second electrode is coupled to the support structure via another insulator.

17. The apparatus of claim 15, wherein the insulator comprises a material selected from a group consisting of a ceramic, a rubber, and a polymer.

18. The apparatus of claim 14, wherein the support structure comprises an insulator.

19. The apparatus of claim 14, wherein the support structure has a shape of a rod.

20. The apparatus of claim 19, wherein the rod is hollow.

21. The apparatus of claim 20, wherein the rod comprises apertures configured to allow a solution to pass there-through.

22. The apparatus of claim 20, wherein the rod contains electrolytes, a pH control solution, or both.

23. A method to decontaminate soil, the method comprising:
   inserting an apparatus according to claim 1 into soil; and
   applying an electrical current to the apparatus.

24. The method of claim 23, wherein inserting comprises applying a rotational force to the apparatus.

25. The method of claim 24, wherein the rotational force serves to screw at least the first electrode, which is helically shaped, into the soil.

26. The method of claim 23, further comprising removing the first electrode, which is helically shaped, from the soil.

27. The method of claim 23, wherein applying the electrical current to the apparatus causes metal ions in the soil to become attracted to the first electrode, the second electrode, or both.

28. The method of claim 23, wherein the inserting is performed using a drill.

29. The method of claim 23, further comprising pre-processing the soil to prepare it for removal of metal contaminants.

30. The method of claim 23, further comprising applying a solution comprising at least an electrolyte, a pH control solution, or both to the soil.

31. The method of claim 30, wherein applying the solution is achieved by flowing the solution through the apparatus while the apparatus is inserted into the soil.

32. The method of claim 23, wherein applying the electrical current comprises using the first electrode as a cathode and using the second electrode as an anode.

33. The apparatus of claim 1, wherein the material suitable to be drilled through soil at the bottom ends of the first electrode and the second electrode is selected from a group consisting of iron, cast iron, carbon steel, high-speed steel, titanium, carbon-fiber reinforced polymer (CFRP) and glass fiber reinforced polymer (GFRP).

* * * * *